March 24, 1953  L. M. OBERLIN  2,632,324
APPARATUS FOR DETERMINING PERMEABILITY
Filed Dec. 2, 1949
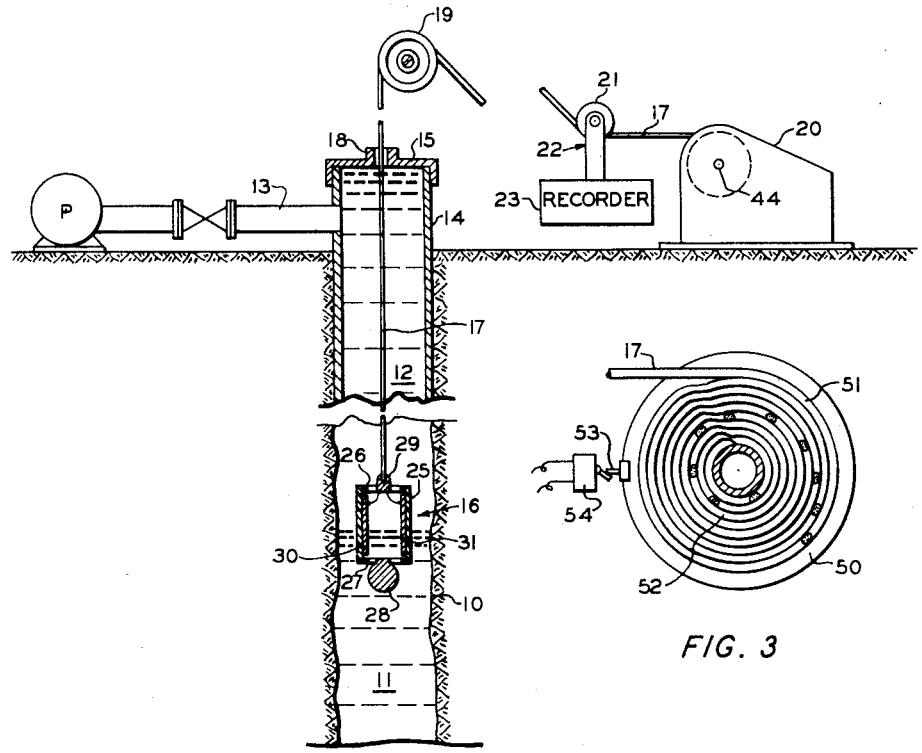
FIG. 1
FIG. 3
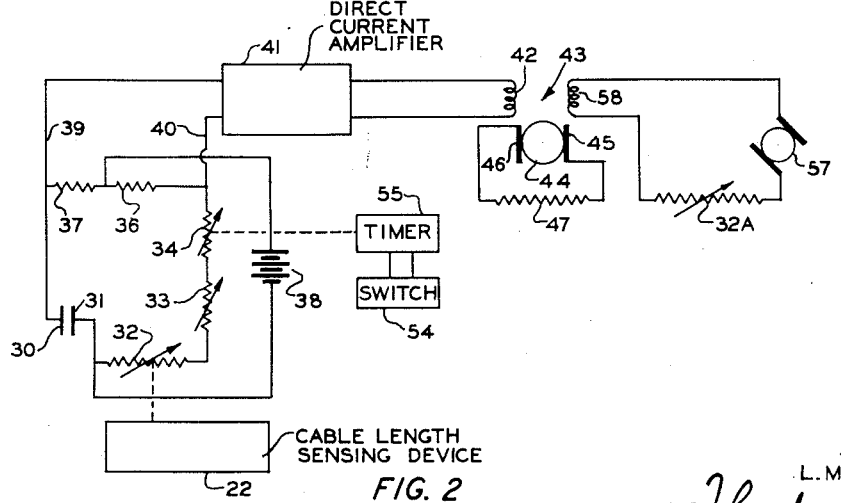
FIG. 2
INVENTOR.
L. M. OBERLIN
BY Hudson & Young
ATTORNEYS Patented Mar. 24, 1953

2,632,324

UNITED STATES PATENT OFFICE 2,632,324

APPARATUS FOR DETERMINING PERMEABILITY

Lyman M. Oberlin, Bartlesville, Okla., assignor to Phillips Petroleum Company, a corporation of Delaware Application December 2, 1949, Serial No. 130,843

9 Claims. (Cl. 73—152)

This invention relates to apparatus for determining relative permeability of formations adjoining a drill hole. In another aspect, it relates to apparatus for maintaining a sensing device continuously at an interface between two liquids when determining a measure of permeability.

Heretofore, relative permeability has been measured by pumping a column of a heavy liquid, such as water, into a drill hole and, thereupon, pumping a column of oil at a known and preferably constant rate into the well. In this manner, an interface is formed between the oil and water columns, with the rate of downward movement of the interface being a measure of the permeability of the strata adjoining the drill hole. As the cable was paid out in prior art devices for determining relative permeability, the interface detector was maintained at the interface by a surface operator. Movement of the float type detector away from the interface in either direction changed the tension or "feel" of the cable, thus enabling the operator to maintain the detector at the interface. However, float type detectors require constant attention of the operator during the logging procedure. It has also been proposed to utilize an electric interface locator of such nature that an indication was continuously produced of the position of the interface-locating device which enabled the operator to adjust the position of the cable in such manner as to maintain the device continuously at the interface. Here again, the operator must constantly watch an instrument board. I have, therefore, devised apparatus whereby the permeability survey of a well may be made with greater accuracy and speed and without the usual fatigue of the operator.

It is an object of my invention to provide means for continuously and automatically maintaining an interface-locating device at its proper position in a very accurate manner.

It is a further object to provide an improved apparatus for determining relative permeability of formations adjoining a drill hole by the use of a device which is automatically maintained at an interface between two liquid columns in a drill hole.

It is a still further object to provide apparatus which is simple in construction, rugged, and reliable in operation.

Various other objects, advantages and features of the invention will become apparent from the following detailed description taken in conjunction with the accompanying drawings, in which:

Figure 1 is a vertical, sectional view partially in elevation, of the apparatus of this invention;

Figure 2 is a schematic diagram of the electrical portion of the apparatus; and

Figure 3 is a view illustrating a feature of the invention.

Referring now to the drawings in detail and particularly to Figure 1, a drill hole 10 contains a column 11 of a relatively heavy liquid, such as water, together with a column 12 of a relatively light liquid, such as oil. In measuring the relative permeability of formations adjoining the drill hole, oil is continuously injected into the well at a known and preferably constant rate through a pump P and a valved conduit 13 which communicates with the upper portion 14 of the well casing, this casing being provided with a casinghead 15.

An interface-locating device 16 of novel construction is suspended within the drill hole by a cable 17, this cable passing through a stuffing box 18 in casinghead 15 and, thence, over a pulley 19 to a windlass 20. The cable includes electrical conductors which extend from the device 16 to suitable slip rings and brushes, not shown, which form a part of the windlass 20. The cable 17 is also contacted by a feeler or measuring wheel 21 of a cable length sensing device 22 which actuates a recorder 23, this recorder including a variable resistance whose ohmic value is proportional, at all times, to the length of cable paid out from windlass 20.

The interface-locating device 16 includes a generally cylindrical casing 25 of insulating material, this casing being provided with perforated end caps 26 and 27, and a weight 28 being secured to end cap 27 to maintain the interface-locating device properly oriented within the drill hole. The cable 17 is attached to a suitable supporting bracket 29 formed on end cap 26. Mounted at diametrically opposite positions within the casing 25 is a pair of arcuate segmental electrodes 30 and 31.

Assuming that the device 16 were wholly suspended within the oil column 12, the resistance or impedance between the plates would be extremely great, due to the insulating qualities of the oil. In contrast, if the device 16 were wholly suspended within the water column 11, the resistance between the electrodes would be relatively small, since the conductivity of the water column is substantially greater than that of the oil, it being understood that the water used in making permeability measurement is somewhat contaminated with salts and other ionic materials which cause it to be somewhat conductive. When the device 16 is in the position shown, that is, partially immersed in the water column and partially immersed in the coil column, there is a characteristic value of electrical conductivity between the electrodes 30, 31. Accordingly, the resistance between electrodes 30, 31 is characteristic of the location of device 16 relative to the interface between the columns 11, 12.

In measuring the relative permeability of the formations adjoining the drill hole, oil is continuously pumped into the hole through conduit 13 at a constant rate and the rate of descent of the interface is a function of the permeability of the adjoining formations and the diameter of the drill hole. The effect of variations in hole diameter are compensated for, in the usual manner, either by making a caliper survey of the hole or by providing a column of intermediate specific gravity between the columns 11 and 12, as disclosed in the copending application of Howard J. Pankratz, Serial No. 124,126, filed October 28, 1949.

In accordance with my invention, the interface-locating device is continuously and automatically maintained at the interface between columns 11, 12 by the apparatus now to be described. This apparatus includes a Wheatstone bridge circuit, Figure 2, one arm of which includes the electrodes 30, 31 and another arm of which includes variable resistances 32, 33, and 34, the bridge circuit being completed by balancing resistances 36 and 37. Direct current is applied between two opposite terminals of the bridge by a battery or other direct current source 38, and the other pair of opposite bridge terminals is connected by leads 39, 40 to the input circuit of a direct current amplifier 41. The output of this amplifier is fed to an excitation winding 42 of a generator 43 which is mechanically connected to shaft 44 of the windlass 20. The generator also includes an armature 44 connected by slip rings 45, 46 to a load resistor 47.

In the operation of the apparatus, assuming the device 16 to be located at its proper position at the interface, downward movement of the interface will produce an increase in resistance between electrodes 30, 31 with the result that an unbalance voltage appears across the bridge circuit and is fed to amplifier 41. The amplifier 41 decreases the excitation supplied to generator coil 42 and, hence, decreases the load upon the windlass 20, thereby permitting more cable to be payed out. When the resulting downward movement of the device 16 causes it to be properly positioned with respect to the interface, the unbalance voltage decreases with resultant increase in the load upon the windlass, thereby to prevent further downward movement of the device 16. If the device should move a short distance beyond the interface, the load upon the generator and windlass will be further increased, thus positively preventing further downward movement of device 16 until the interface falls below its predetermined location upon the device 16. There is, however, very little tendency for the device to move beyond its predetermined desired position, as the load upon the windlass is gradually increased to prevent further downward movement as the device 16 approaches its correct position with respect to the interface and the unbalance voltage of the bridge decreases in a corresponding manner.

It will be, of course, apparent that the weight of the cable 17 produces a change in load upon the windlass assembly which would appear to interfere with operation of the bridge circuit in the manner stated. However, the effect of the cable weight is compensated for by variable resistance 32 which is actuated by cable length sensing device 22. The resistance of component 32 is directly proportional to the amount of cable payed out from the windlass, and the progressive increase of this resistance as the cable is lowered produces a basic unbalance voltage in the bridge which, through the medium of amplifier 41, provides a load upon the windlass by the action of generator 43 which compensates for the weight of the cable payed out. Thus, the incremental unbalance voltage produced by changes in resistance between electrodes 30, 31 produces additional load changes which result in downward movement of the cable and device 16 at the proper rate of speed as to maintain the device always at its proper position with respect to the interface.

The usual cable is wound upon a drum 50, Figure 3, in successive layers. When the cable is being payed out from an outer layer, as at 51, it will be evident that the torque arm of the cable load upon the windlass is substantially greater than the torque arm produced when the cable is being unwound from an inner layer, as at 52. This necessitates a change in the braking torque applied to the windlass shaft by generator or other braking device 43 in accordance with the amount of cable payed out from the windlass. This variation in torque arm is compensated for by providing, upon the drum 50, an actuating element 53 which actuates a switch 54 at each drum revolution to produce a control impulse. These control impulses are fed to a timer 55 which actuates resistance 34 in a stepwise manner. For example, assuming that there are twenty turns of cable in each layer upon the windlass, every twentieth pulse produced by actuation of switch 54 will operate timer 55 to produce a stepwise adjustment of variable resistance 34. This stepwise change in resistance produces a corresponding change in the unbalance voltage of the bridge which, in turn, regulates the load impressed upon the windlass 20 by braking device or generator 43 to compensate for the change in torque arm produced in proceeding from the outer layer 51 to the next succeeding inner layer of the cable. Variable resistance 33 is manually adjusted, at the start of each survey, to compensate for factors such as the specific gravity of liquid column 12, the friction at stuffing box 18 and pulley 19, together with any other constant factors which affect the load upon the windlass assembly.

It will be apparent, therefore, that the bridge circuit produces an unbalance voltage which so regulates the load impressed upon the windlass by the braking device as to maintain the interface-locating device 16 continuously at its proper position with respect to the interface between columns 11 and 12. The bridge circuit also compensates for changes in load produced by paying out the cable from the windlass, for changes in torque arm resulting from the cable being payed out from successive layers of the windlass, and for other constant factors such as the specific gravity of liquid column 12 and the friction of the cable in passing over the pulley and through stuffing box 18.

In a modification of the invention, variable resistance 32 is omitted from the bridge circuit and a resistance 32a, whose ohmic value is proportional to the amount of cable payed out, is connected in circuit with a generator or other current source 57 and a second excitation winding 58 of the generator. In this manner, resistance 32a controls the load impressed by the generator in a direct manner to compensate for variations in length of the cable, and this effect is not produced through an unbalance voltage in the bridge circuit. This modification has the advantage that the bridge may be operated in a more nearly balanced condition at all times, although it necessitates the provision of an additional current source and excitation winding for the generator. The adjustment made by variable resistances 33, 34 may also be accomplished by applying voltages representative of their ohmic values either to excitation winding 58 or other excitation windings of the generator. Moreover, the adjustments made by variable resistance 33 may also be effected by varying load resistance 47. All these modifications together with those which may suggest themselves to those skilled in the art are within the scope of this invention, as defined by the appended claims.

I claim:

1. In apparatus for determining the relative permeability of formations adjoining a drill hole, in combination, an interface-locating device incorporating a pair of spaced electrodes, a cable for suspending said device in said drill hole, a windlass for lowering said cable into a drill hole, a brake mechanically connected to said windlass, means responsive to the impedance between said electrodes for varying the force produced by said brake on said windlass, a cable length sensing device, and means responsive to said sensing device for varying said braking force.

2. In apparatus for determining the relative permeability of formations adjoining a drill hole, in combination, an interface-locating device incorporating a pair of spaced electrodes, a cable for suspending said device in said drill hole, a windlass for lowering said cable into a drill hole, a brake mechanically connected to said windlass, means responsive to the resistance between said electrodes for varying the torque produced by said brake on said windlass, a cable length sensing device, means responsive to said sensing device for varying the torque produced by said brake, and means responsive to the paying out of cable from said windlass to decrease the torque produced by said brake in a stepwise manner to compensate for the change in torque arm of the cable upon the windlass in proceeding from outer to inner layers of the cable on the windlass.

3. Apparatus for continuously maintaining a device at an interface between two liquids in a drill hole which comprises, in combination, an electrical interface-locating device incorporating a variable impedance having a characteristic value when said device is positioned at an interface, a cable for lowering said device into said drill hole, a windlass for paying out said cable, a generator having an excitation winding, the armature of said generator being mechanically connected to said windlass, a Wheatstone bridge circuit including said variable impedance and a plurality of balancing impedances, an amplifier responsive to an unbalance voltage appearing across said bridge, and means for feeding the output of said amplifier to said excitation winding.

4. Apparatus for continuously maintaining a device at an interface between two liquids in a drill hole which comprises, in combination, an electrical interface-locating device incorporating a variable impedance having a characteristic value when said device is positioned at an interface, a cable for lowering said device into said drill hole, a windlass for paying out said cable, a generator having an excitation winding, the armature of said generator being mechanically connected to said windlass, a Wheatstone bridge circuit including said variable impedance, a variable resistance, and a plurality of balancing resistors, a cable length sensing device, means actuated by said sensing device for varying the setting of said variable resistance, an amplifier, means for feeding an unbalance voltage appearing across said bridge to said amplifier, and means for feeding the output of said amplifier to said excitation winding.

5. Apparatus for continuously maintaining a device at an interface between two liquids in a drill hole which comprises, in combination, an electrical interface-locating device incorporating a variable impedance having a characteristic value when said device is positioned at an interface, a cable for lowering said device into said drill hole, a windlass for paying out said cable, a generator having an excitation winding, the armature of said generator being mechanically connected to said windlass, a Wheatstone bridge circuit including said variable impedance, a variable resistance, and a pair of balancing resistors, an actuating arm on a movable part of said windlass, a switch actuated by said arm during each revolution of said windlass, a timing device which is operated in response to a predetermined number of actuations of said switch, means controlled by said timer for varying the setting of said variable resistance in a stepwise manner, an amplifier, means for feeding an unbalance voltage appearing across said bridge to said amplifier, means for feeding the output of said amplifier to said excitation winding, and means for varying the torque produced by said generator in proportion to the weight of the cable payed out by said windlass.

6. Apparatus for continuously maintaining a device at an interface between two liquids in a drill hole which comprises, in combination, an electrical interface-locating device incorporating a variable impedance having a characteristic value when said device is positioned at an interface, a cable for lowering said device into said drill hole, a windlass for paying out said cable, a generator having an excitation winding, the armature of said generator being mechanically connected to said windlass, a Wheatstone bridge circuit including said variable impedance as one arm thereof, three variable resistances connected in series in another arm of said bridge, and balancing resistors forming the other arms of said bridge, a direct current amplifier, means for feeding an unbalance voltage appearing across said bridge to the input circuit of said amplifier, means for feeding the output of said amplifier to said excitation winding, a cable length sensing device, means controlled by said sensing device for operating one of said variable resistances, means for manually operating another of said variable resistances, a timer for actuating the third variable resistance in a stepwise manner, and means for actuating said timer after a predetermined number of revolutions of said windlass.

7. Apparatus for continuously maintaining a device at an interface between two liquids in a drill hole which comprises, in combination, an electrical interface-locating device incorporating a variable impedance having a characteristic value when said device is positioned at an interface, a cable for lowering said device into said drill hole, a windlass for paying out said cable, a generator having an excitation winding, the armature of said generator being mechanically connected to said windlass, a Wheatstone bridge circuit including said variable impedance as one arm thereof, a variable resistance disposed in another arm of said bridge, balancing resistors defining the third and fourth arms of said bridge, a timer for actuating said variable resistance in a stepwise manner, means for actuating said timer responsive to a predetermined number of revolutions of said windlass, a direct current amplifier, means for applying an unbalance voltage appearing across said bridge to the input circuit of said amplifier, means for feeding the output of said amplifier to said excitation winding, a second excitation winding on said generator, a cable length sensing device, and means controlled by said sensing device for varying an electrical voltage supplied to said second excitation winding.

8. Apparatus for determining the relative permeability of formations adjoining a drill hole, said hole containing a column of heavy liquid, a column of light liquid and an interface separating said columns, means for pumping light liquid into the upper portion of said hole, an electrical interface-locating device incorporating a variable impedance having a characteristic value when said device is positioned at an interface, a cable for lowering said device into said drill hole, a windlass for paying out said cable, a generator having an excitation winding, the armature of said generator being mechanically connected to said windlass, a Wheatstone bridge circuit including said variable impedance and a plurality of balancing impedances, an amplifier responsive to an unbalance voltage appearing across said bridge, and means for feeding the output of said amplifier to said excitation winding.

9. Apparatus for determining the relative permeability of formations adjoining a drill hole, said hole containing a column of heavy liquid, a column of light liquid and an interface separating said columns, means for pumping light liquid into the upper portion of said hole, an electrical interface-locating device incorporating a variable impedance having a characteristic value when said device is positioned at an interface, a cable for lowering said device into said drill hole, a windlass for paying out said cable, a generator having an excitation winding, the armature of said generator being mechanically connected to said windlass, a Wheatstone bridge circuit including said variable impedance as one arm thereof, a variable resistance disposed in another arm of said bridge, and balancing resistors defining the third and fourth arms of said bridge, a timer for actuating said variable resistance in a stepwise manner, means for actuating said timer responsive to a predetermined number of revolutions of said windlass, a direct current amplifier, means for applying an unbalance voltage appearing across said bridge to the input circuit of said amplifier, means for feeding the output of said amplifier to said excitation winding, a second excitation winding on said generator, a cable length sensing device, and means controlled by said sensing device for varying an electrical voltage supplied to said second excitation winding.

LYMAN M. OBERLIN.

REFERENCES CITED

The following references are of record in the file of this patent:

UNITED STATES PATENTS

| Number | Name | Date |
| --- | --- | --- |
| 871,124 | Knoblock | Nov. 19, 1907 |
| 1,537,919 | Elliott | May 12, 1925 |
| 2,394,220 | Wagner | Feb. 5, 1946 |
| 2,413,435 | Courter | Dec. 31, 1946 |

FOREIGN PATENTS

| Number | Country | Date |
| --- | --- | --- |
| 435,441 | Great Britain | Sept. 20, 1935 |